M. B. LLOYD.
APPARATUS FOR WELDING THE LONGITUDINAL SEAMS OF METAL TUBES.
APPLICATION FILED APR. 6, 1912.
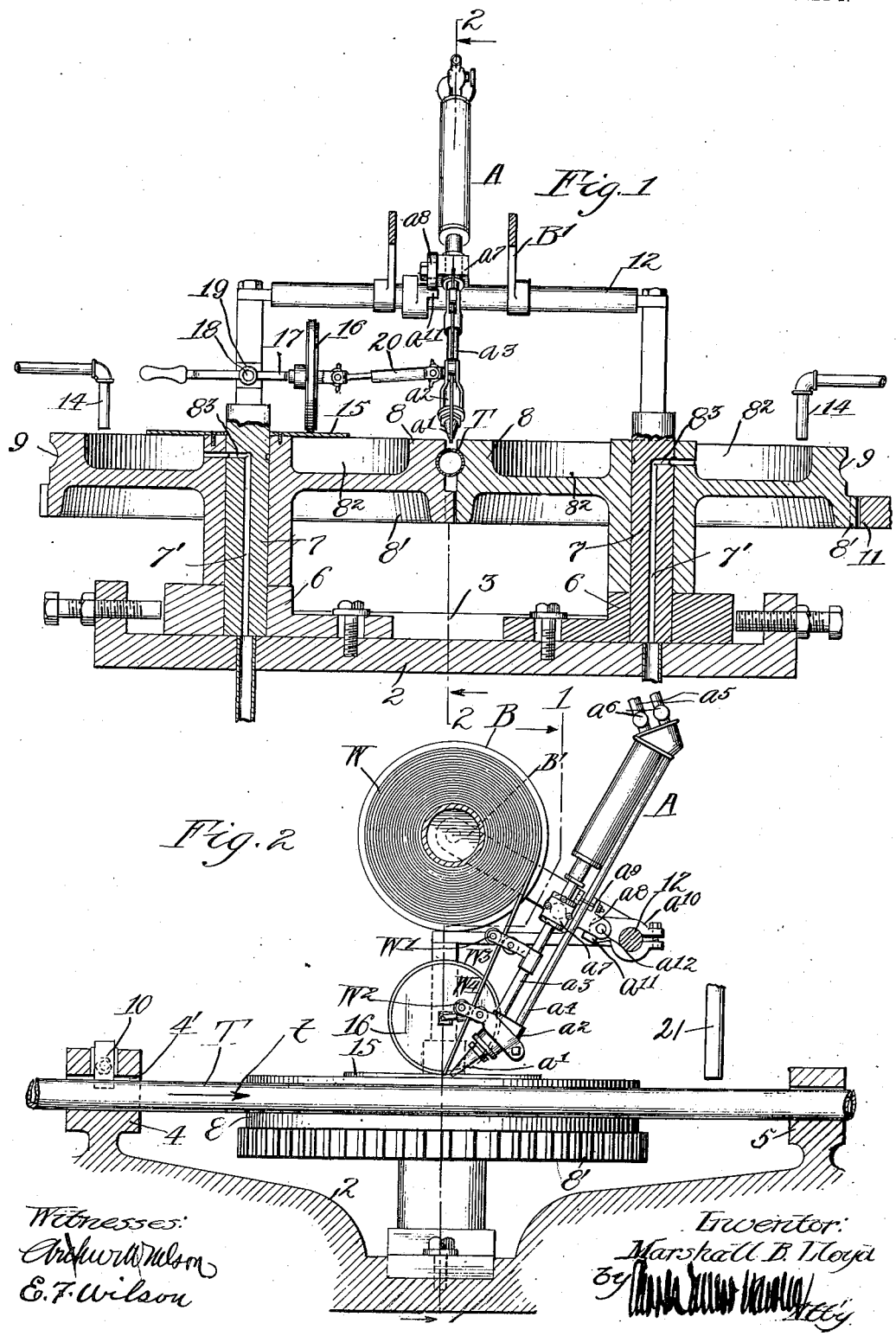

M. B. LLOYD.
APPARATUS FOR WELDING THE LONGITUDINAL SEAMS OF METAL TUBES.
APPLICATION FILED APR. 6, 1912.
1,124,758.
Patented Jan. 12, 1915.
2 SHEETS—SHEET 2.
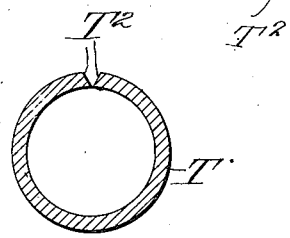
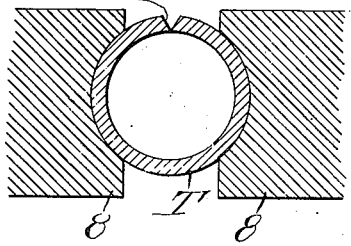
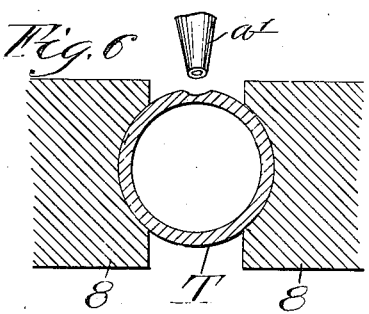
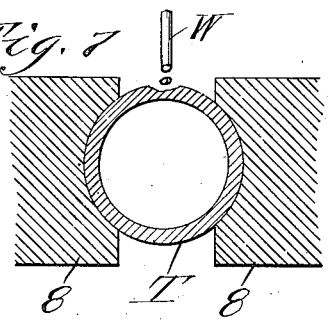
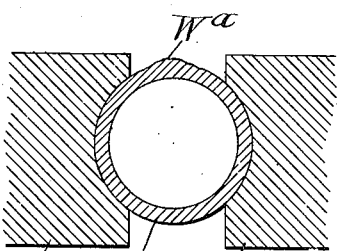
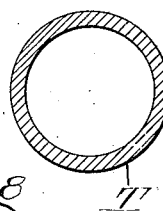
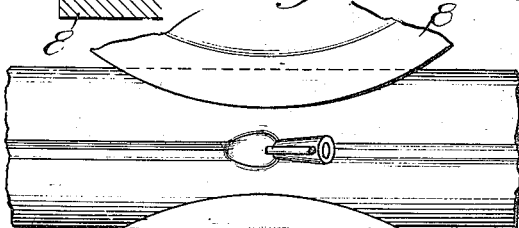

UNITED STATES PATENT OFFICE.

MARSHALL BURNS LLOYD, OF MENOMINEE, MICHIGAN, ASSIGNOR, BY MESNE ASSIGNMENTS, TO THE ELYRIA IRON & STEEL COMPANY, OF ELYRIA, OHIO, A CORPORATION OF OHIO.

APPARATUS FOR WELDING THE LONGITUDINAL SEAMS OF METAL TUBES.

1,124,758. Specification of Letters Patent. Patented Jan. 12, 1915.

Application filed April 6, 1912. Serial No. 689,097.

*To all whom it may concern:*

Be it known that I, MARSHALL BURNS LLOYD, a citizen of the United States, and a resident of Menominee, county of Menominee, and State of Michigan, have invented a certain new, useful, and Improved Apparatus for Welding the Longitudinal Seams of Metal Tubes, of which the following is a specification.

My invention relates to improvements in the art of manufacturing metal tubes and has special reference to the welding of the longitudinal seams of metal tubes.

The object of my invention is to provide a new and improved apparatus for producing welded tubing of superior quality at less cost than has been possible heretofore.

My invention will be more readily understood by reference to the accompanying drawings which form part of this specification and in which I have illustrated the several steps of my novel continuous process of welding metal tubing together with apparatus that I have devised for automatically carrying out said process or method.

In the drawings: Figure 1 is a transverse vertical section of the welding apparatus on the line 1—1 of Fig. 2; Fig. 2 is a vertical section on the line 2—2 of Fig. 1; and Figs. 3, 4, 5, 6, 7, 8, 9 and 10 are diagrammatic sectional views depicting certain stages in the manufacture of a metal tube and illustrating phases of the invention that are not at once apparent in Figs. 1 and 2.

The part 2 represents a suitable frame which contains a transverse guide 3 and supports two members 4 and 5, uses of which will be explained. In the guide 3 are adjustable blocks 6—6 containing upright stud shafts 7—7 which rise to a considerable height. On these stud shafts I arrange two disks or wheels 8—8, having long hubs on the shafts 7 whereby the two disks are maintained in the same plane. The disks as shown in Fig. 1 do not meet but are separated by a narrow space. The periphery of each disk or wheel 8 contains a groove 9 and the two grooves are of such form as to fit and receive the tube T which is to be welded. It will be noted that the wheels rotate in a horizontal plane and the tube T passes horizontally between the peripheries of the disks 8, 8, occupying the opening provided by the grooves 9 therein. In the member 4 is a guide 4' made to fit the tube and containing a vertical blade 10 which enters the seam of the tube. It is to be understood that when the end of a tube is inserted in a guide 4', its seam is placed uppermost to admit the blade 10. This blade will be referred to hereinafter as the seam positioning device. The guide 4' is in axial alinement with the opening between the disks 8—8. The member 5 contains a guide opening which is also in axial alinement therewith, thus it will be noted that the tube is supported at three points, namely; by the member 4, by the disks 8—8, and by the member 5. When the machine is in operation the tube moves in the direction of the arrow $t$ in Fig. 2. In practice I usually employ a draw bench which engages the tube behind the member 5 for drawing the tube forward at constant speed; but in other cases I depend upon the disks 8 to move the tube longitudinally and in such cases I connect the disks 8—8 by large spur gears 8', 8' of equal diameter. One of the gears is positively driven as by a pinion 11 (Fig. 1) and it is obvious that the disks will rotate at the same speed. Whatever the nature of the drawing or driving mechanism, I construct the same to impart to the tube a constant speed movement. As before stated the blocks 6 which contain the shafts of the disks 8 are adjustable in the guide 3, and are secured by means of the screws shown in Fig. 1 and it will be clear that the disks may be slightly moved together or slightly separated as may be required to maintain a uniform pressure upon the tube T between them. This pressure of the disks is utilized for holding the seam edges of the tube together in readiness to be welded. The stud shafts 7 do not rotate, they extend upward beyond the disks 8 and are connected by a bridge bar or yoke 12. The cross member of this yoke is preferably disposed some distance back of the meeting point of the disks 8, 8 and serves as a support for the welding torch A.

I prefer that the torch A shall be of the oxy-acetylene type, the principal elements of which are a pointed nozzle $a^1$, a mixing head $a^2$, in which the nozzle is secured and gas supply pipes $a^3$ and $a^4$ which bear the mixing head. Oxy-acetylene gases are supplied through flexible tubes $a^5$, the passages being controlled by suitable valves $a^6$. The pipe $a^3$ which is most nearly central with the nozzle $a^1$ is clasped by a block $a^7$ which may rotate on a horizontal trunnion provided in an arm $a^8$. The pipe $a^3$ may rotate on its axis within the block $a^7$. The arm $a^8$ and the block are connected by an adjusting screw or bolt $a^9$ used for accurately adjusting the point of the nozzle with respect to the tube between the disks 8, 8. The arm $a^8$ is pivoted on a block $a^{10}$ adjustably arranged on the yoke 12. It may swing backwardly but cannot fall below the position shown in Fig. 2, movement in that direction being limited by a stop $a^{11}$ on the block $a^{10}$. This freedom of backward movement permits the torch to be swung out of working position when necessary. The stop $a^{11}$ insures the readjustment of the nozzle at the same point with respect to the tube, when the torch is again swung down to working position. The torch swings on the pivot $a^{12}$. The nozzle as shown extends downwardly at an angle of about 45 degrees toward the entrance guide 4'. When in operation a flame is projected from the nozzle in a direction contrary to the movement of the tube. The normal position of the tip of the nozzle is slightly above the tube and between the disks 8—8 directly over the tube seam. The tube positioner 10 before described serves to definitely locate the seam at the top of the tube so that the tube shall enter the disks with its seam midway between the latter. The tubes are not always straight and the seams thereof are frequently wavy and sometimes of a spiral form. The portion of the tube between the disks 8 is held against rotation and as the tube is moved forward it is pulled through the guide 4' and the blade 10 automatically forces the tube to assume its proper position in the guide 4', these parts at times effecting considerable torsional movement of the tube as required to straighten the seam preparatory to entrance to the welding disks. The edges of the disks 8 serve to confine the flame of the torch to the top of the tube. They are heated by the flame.

It is desirable that the disks shall always be cool; I therefore provide them with water pockets or recesses $8^2$. Pipes 14 supply streams of water to the disks and the water empties therefrom through the passages $8^3$ and 7' in the disk hubs and shafts 7.

The device B shown above the torch is a reel which is carried by arms $B^1$ capable of limited pivotal movement on the yoke 12, so that the reel may be swung back or raised with the torch. This reel carries a bundle of wire W which may be the same metal as that of which the tube is composed. The wire may be of a different metal, such as brass, but in welding steel tubes I prefer to use wire which contains less carbon than the steel composing the tube; I add this metal to the seam of the tube in the manner about to be explained. The acetylene gas used in the torch tends to carbonize the weld of the tube and by this simple expedient of adding lower carbon metal, the carbonizing effect of the flame is compensated with the result that the weld portion of the finished tube is substantially uniform with the remainder of the tube. Referring again to Figs. 1 and 2, it will be seen that the end of the wire passes from the reel through two pairs of guide reels $W^1$ and $W^2$. These are held by arms $W^3$ and $W^4$ conveniently attached to the torch. The wire therefore moves with the torch when the torch is swung or adjusted. The guide rolls are so arranged as to direct the extreme end of the wire downwardly to a point opposite and just above the tip or lower end of the nozzle $a^1$. Thus positioned the end of the wire is in practical contact with the hottest part of the flame from the torch and will be melted thereby. The metal detached from the wire in this manner falls through the flame and lodges in or upon the seam of the tube at the hottest point. Metal which is supplied in this manner at the same temperature as the seam edges of the tube quickly unites therewith. The quantity of metal to be supplied depends upon the dimensions of the open seam in the tube and also depends somewhat upon the consumption of the seam edges due to the intense heat of the flame.

For regulating the addition of metal, in other words for feeding and regulating the feed of the wire to the torch, I provide means for positively driving one set of the guiding feed rolls and I so construct this portion of the mechanism that the speed of the rolls may be changed to vary the rate at which the wire is fed. This mechanism is well shown in Figs. 1 and 2 wherein 15 represents a friction disk carried by one of the disks 8.

16 is a transverse friction disk which is journaled on a horizontal shaft 17 and rolls on the disk 15.

18 represents a hand screw or the like by which the shaft 17 may be secured in desired position in its bearing 19.

Movement of the friction wheel 16 toward and from the center of the disk 15 serves to respectively lessen and increase the rotative speed of the friction wheel 16. The hub of the friction wheel 16 is connected with the inner roll of the part $W^2$, the connection comprising a telescoping shaft 20 and suitable universal joints, the latter being required because the rolls $W^2$ are not in line with the axis of the wheel 16 and because it is desired to leave the torch free to swing and to be adjusted as hereinbefore described. When the parts are in operation the disk 15 will impart rotation to the friction wheel 16 and the latter through the medium of the telescoping shaft will drive the rolls W² and thus positively propel or feed the wire toward the tube seam. If it is found that an insufficient quantity of metal is being supplied in this manner, the friction wheel 16 will be moved toward the periphery of the disk 15 to increase the rate at which the metal wire is fed; and if the feed of wire is found to be too rapid it is only necessary to shift the friction wheel toward the center of the disk 15. The parts are so constructed in proportion that but slight adjustment of the friction wheel is required to meet all conditions.

Tubing of the kind here referred to is usually made by transversely rolling a long strip of either hot rolled or cold rolled metal of an initial cross-section approximating that which is shown in Fig. 3. When such a strip is rolled or formed into a tube, the tube edges T² will be found to present a seam of V shape, as indicated in Fig. 4. Though the edges be pressed firmly together between the disks 8—8 the V form of the seam is not materially changed. This condition is indicated in Fig. 5. The flame from a gas torch of the kind herein described comprises first an inner intensely hot jet or flame and a larger portion known as the corona. The short intensely hot flame is the portion hereinbefore referred to as the flame, the corona being of much lower temperature and extending its heat more generally upon the top of the tube. When the intense flame strikes the flaring edges T², T² of the tube seam, as the tube moves forward, the flame almost immediately reduces the edges to a molten state and they flow together. The pressure of the rolls or disks 8, 8 tends to compress the hot edges, likewise the expansion of the edges tends to press them together; nevertheless when the seam is closed in this manner, the portion comprising the weld is usually of less thickness than the remainder of the tube as indicated in Fig. 6; and this effect is augmented by the consumption of part of the metal by the intense flame. Close observation discloses the fact that the flame impinging upon the edges of the tube when the latter have been rendered momentarily molten, temporarily depresses the surface of the molten metal and in positioning the end of the wire W with respect to the nozzle, I take care that its position shall be such that as the metal melts from the end of the wire, it will drop approximately into the shallow cavity or depression produced by the flame. This action and relation are indicated by Figs. 7 and 10. The metal which falls upon the hot seam is distributed by the force of the flame and quickly unites the metal of the tube edges, giving thereto the bulk or thickness which is needed to make the weld portion as thick and strong as the other portions of the tube, to form the thickened seam or weld.

As explained the tube moves forward at constant speed and therefore the seam is removed from the torch as rapidly as it is formed. It cools almost at once and if desired the cooling of the tube may be hastened by a spray of water delivered upon the tube by a pipe 21. The metal added from the strip W sometimes form a bur Wᵃ, on the tube as indicated in Fig. 8. When such is the case, the bur is subsequently removed by any suitable means, such as a special planing tool. Thus the finished tube is substantially uniform in strength and cross section (Fig. 9) and the edges are so intimately joined that the weld is hardly perceptible.

As various modifications of my invention will readily suggest themselves to one who is skilled in the art, I do not limit or confine the invention to the specific steps and structures herein specifically described.

Having thus described my invention, I claim as new and desire to secure by Letters Patent:

1. The improvements herein described comprising means for moving a metal tube longitudinally and simultaneously holding the seam edges thereof in abutment at one point in the travel of the tube, in combination with a welding torch adapted to project a welding flame upon the seam edges of the tube at said point and a metal wire feeding mechanism formed and adapted to feed the end of a wire continuously into the top of said flame whereby to deposit molten metal upon the seam of the tube, substantially as and for the purpose specified.

2. The improvements herein described comprising means for moving a metal tube longitudinally and simultaneously holding the seam edges thereof in abutment at the top of the tube, in combination with a welding torch adapted to project a welding flame upon the seam edges of the tube during movement of the tube, a reel for wire and a wire feeding mechanism connected with said torch for directing the end of the wire continuously into the flame of the torch directly above the seam of the tube, as and for the purpose specified.

3. The improvements herein described comprising a mechanism for feeding a metal tube longitudinally and at constant speed, said mechanism being adapted to hold the seam edges uppermost and in abutment at one point in the travel of the tube, in combination with a welding torch adapted to project a welding flame upon the seam edges of the tube at said point in a direction contrary to the movement of the tube, a wire feeding mechanism, said wire feeding mechanism and said torch being movable together for adjustment and variable speed mechanism for actuating said wire feeding mechanism at a speed proportional to the longitudinal movement of the tube and serving to feed the wire continuously into the flame.

4. The improvements herein described comprising a mechanism for feeding a metal tube longitudinally and at constant speed, said mechanism being adapted to hold the seam edges uppermost and in abutment at one point in the travel of the tube, in combination with a welding torch adapted to project a welding flame upon the seam edges of the tube at said point in a direction contrary to the movement of the tube, a variable speed wire feeding mechanism on that side of torch which is toward the oncoming tube and adapted to supply wire continuously thereto at a speed proportionate to the travel of the tube.

5. The improvements herein described comprising mechanism for moving a tube longitudinally at constant speed and for pressing the seam edges together at one point in the travel of the tube, and a tube positioning device spaced from the seam pressing device and adapted to present the tube to the pressing means with the seam uppermost, in combination with a welding torch adapted to project a welding flame upon the seam edges of the tube at said point of pressure, a wire feeding mechanism movable with the torch and formed to feed the wire continuously and means for varying the speed of the wire feeding mechanism as and for the purpose specified.

6. The improvements herein described comprising mechanism for moving a tube longitudinally at constant speed and for pressing the seam edges together at one point in the travel of the tube and a tube positioning device spaced from the seam pressing device and adapted to present the tube to the pressing means with the seam uppermost, in combination with a welding torch adapted to project a welding flame upon the seam edges of the tube at said point of pressure, wire feeding mechanism mounted for movement with the torch, said wire feeding mechanism presenting the wire continuously to the torch from above at substantially the angle of inclination of the torch.

7. The improvements herein described comprising mechanism for moving a tube longitudinally at a constant speed and for pressing the seam edges together at one point in the travel of the tube, a welding torch adapted to project a flame upon the seam edges of the tube at said point of pressure, in combination with wire-feeding mechanism and means for operating said wire feeding mechanism from the tube forwarding means for feeding the wire continuously to the welding flame at a speed proportional to the movement of the tube.

8. The improvements herein described comprising mechanism for moving a tube longitudinally at a constant speed, and for pressing the seam edges together at one point in the travel of the tube, a tube positioning device spaced from the seam pressing device and adapted to present a tube to the pressing means with the seam uppermost, a welding torch arranged to project a welding flame upon the seam edges of the tube at said point of pressure, in combination with a wire feeding mechanism, variable speed driving means for said wire feeding mechanism actuated by said tube-moving mechanism and adapted to feed the wire continuously to the welding flame at a speed proportional to the movement of the tube.

In testimony whereof, I have hereunto set my hand, this 11th day of March, 1912, in the presence of two subscribing witnesses.

MARSHALL BURNS LLOYD.

Witnesses:
HILDA C. PETERSON,
CHARLES GILBERT HAWLEY.